United States Patent [19]

Kuno

[11] Patent Number: 4,697,678
[45] Date of Patent: Oct. 6, 1987

[54] CLUTCH COVER
[75] Inventor: Shozo Kuno, Toyota, Japan
[73] Assignee: Aisin Seiki Kabushiki Kaisha, Aichi, Japan
[21] Appl. No.: 828,268
[22] Filed: Feb. 11, 1986
[30] Foreign Application Priority Data Feb. 13, 1985 [JP] Japan .......................... 60-019832[U]

[51] Int. Cl.⁴ ............................................. F16D 13/50
[52] U.S. Cl. .............................. 192/70.28; 192/89 B; 192/109 A
[58] Field of Search ............... 192/70.18, 70.25, 70.27, 192/70.28, 89 B, 109 R, 109 A, 109 B, 70.13, 70.22

[56] References Cited

U.S. PATENT DOCUMENTS

| 1,644,548 | 10/1927 | Spase | 192/70.13 |
| 2,085,167 | 6/1937 | Nitt | 192/107 C |
| 2,359,184 | 9/1944 | Wolfram | 192/70.27 |
| 3,130,828 | 4/1964 | Maurice | 192/66 |
| 3,198,294 | 8/1965 | Stacy | 188/234 |
| 3,250,356 | 5/1966 | Zeidler | 192/70.26 |
| 3,702,651 | 11/1972 | Fujita et al. | 192/70.25 |
| 3,712,435 | 1/1973 | Kraus | 192/70.27 |
| 3,773,155 | 11/1973 | Fujita et al. | 192/70.25 |
| 4,114,740 | 9/1978 | Sugiura et al. | 192/70.18 |
| 4,231,456 | 11/1980 | Nakane et al. | 192/70.25 |
| 4,317,435 | 3/1982 | Kohlage | 123/179 J |
| 4,560,055 | 12/1985 | Billet | 192/109 R |
| 4,577,740 | 3/1986 | Carmillet | 192/70.18 |
| 4,640,400 | 2/1987 | Nakane | 192/70.25 |

FOREIGN PATENT DOCUMENTS

| 2808019 | 8/1979 | Fed. Rep. of Germany | 192/89 B |
| 867268 | 10/1941 | France | |
| 56-35820 | 4/1981 | Japan | |
| 947408 | 1/1964 | United Kingdom | 192/105 B |

Primary Examiner—John E. Murtagh
Assistant Examiner—Andrew Joseph Rudy
Attorney, Agent, or Firm—Burns, Doane, Swecker & Mathis

[57] ABSTRACT

A clutch cover includes a diaphragm spring arranged between a pressure plate and a cover core and in coaxial relation with the pressure plate for urging the same, and a strap connecting an outer peripheral portion of the pressure plate to an outer peripheral portion of the cover core. The cover core has first and second wall portions, the first wall portion being located at the periphery of the connection between the strap and the cover core and disposed closer to the central axis of the clutch cover than the second wall portion. The first wall portion is provided with a cut-out at a location corresponding to the outer edge of the diaphragm spring so that the outer edge of the diaphragm spring will not contact the second wall portion.

3 Claims, 4 Drawing Figures

CLUTCH COVER

BACKGROUND OF THE INVENTION

This invention relates to improvements in a clutch cover for use generally in the power transmission system of an automotive vehicle.

A prior-art clutch cover of the type to which the present invention pertains is disclosed in, for example, the specification of Japanese Utility Model Kokoku-Publication No. 51-44037. As shown in FIGS. 3 and 4, the prior-art clutch cover comprises a cover core 51 having wall portion 52, a pressure plate 53 enclosed by the wall portion 52 and arranged in coaxial relation with the cover core 51, a diaphragm spring 54 arranged between the pressure plate 53 and cover core 51 and in coaxial relation with the pressure plate 53 for urging the same, and a strap 55 interconnecting the pressure plate 53 and the cover core 51. The strap 55 is connected to the pressure plate 53 by a rivet 56 and to the cover core by a rivet 57.

SUMMARY OF THE INVENTION

A disadvantage is encountered in the prior-art clutch cover described above. Specifically, when the clutch cover is mounted on a vehicle, an outer circumferential portion 60 of the cover core 51 tends to interfere with a housing 61. To prevent this from occurring, the outer circumferential portion 60 is reduced in size and the rivet 57 is placed closer to the central axis of the pressure plate 53 to produce a more compact assembly. To caulk the rivet 57, a sufficient amount of space must be provided in the vicinity thereof to allow the rivet to be accessed by a caulking jig. Therefore a structure has been adopted in which a wall portion 58 of the cover core at the periphery of the rivet 57 is located closer to the central axis X of the pressure plate 53 than a wall portion 59 of the cover core. However, since the diaphragm spring 54 is located on the inner side of the wall portion 58, the wall portion 58 can be brought closer to the central axis by only a very small amount, for otherwise the diaphragm spring 54 and wall portion 58 would come into contact.

Accordingly, an object of the present invention is to solve the aforementioned problem encountered in the prior art.

Another object of the present invention is to provide a clutch cover in which the rivet at the connection between the strap and the cover core can be placed closer to the central axis X of the pressure plate 13 to afford a more compact configuration.

According to the present invention, the foregoing object is attained by providing a clutch cover comprising a cover core, a pressure plate enclosed by a wall portion of the cover core and arranged in coaxial relation with the cover core, a diaphragm spring arranged between the pressure plate and cover core and in coaxial relation with the pressure plate for urging the same, and a strap connecting the outer peripheral portion of the pressure plate to the outer peripheral portion of the cover core. The cover core includes first and second wall portions, the first wall portion being located at the periphery of the connection between the strap and cover core and disposed closer to the central axis of the clutch cover than the second wall portion. The first wall portion is provided with a cut-out at a location corresponding to the outer edge of the diaphragm spring. With such an arrangement, the first wall portion can be brought so close to the central axis of the clutch cover as to overlap the diaphragm spring without being contacted by the spring thanks to the provision of the cut-out. The end result is a clutch cover of a more compact configuration.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
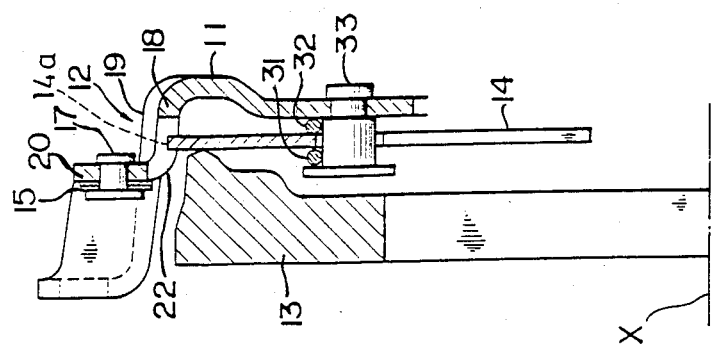
FIG. 2 is a sectional view taken along line II—II of FIG. 1.
Figure 1:
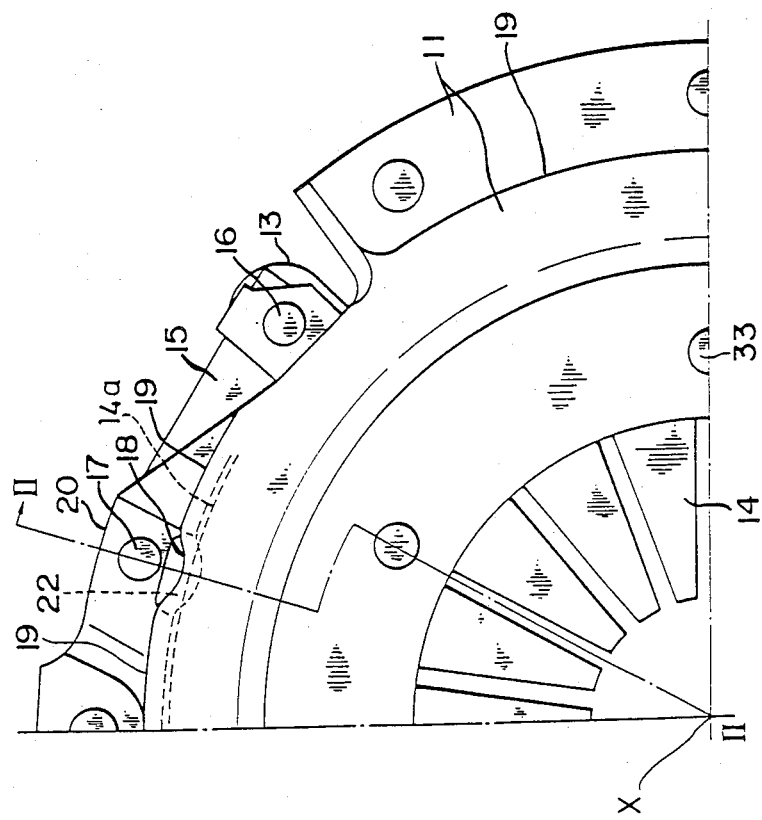
FIG. 1 is a plan view illustrating a preferred embodiment of a clutch cover according to the present invention.
Figure 3:
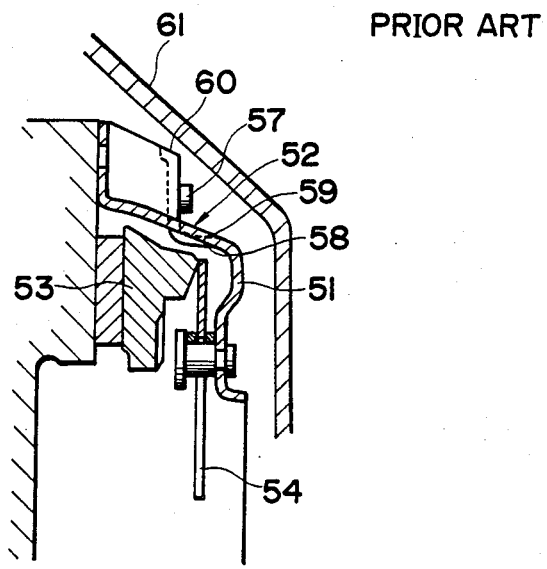
FIG. 3 is a sectional view illustrating a portion of a clutch cover according to the prior art.
Figure 4:
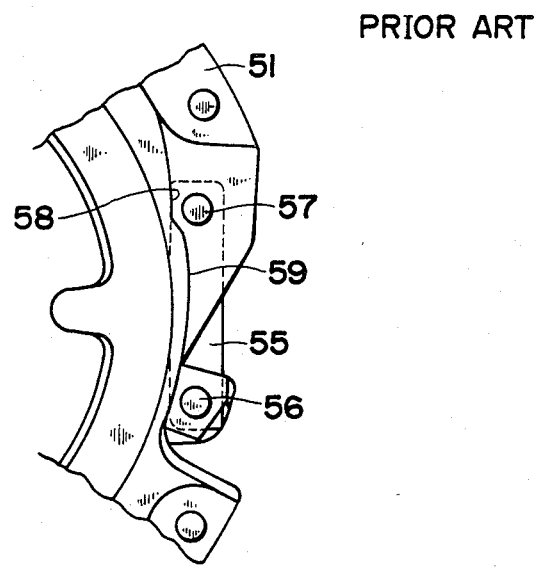
FIG. 4 is a plan view of a portion of the prior-art clutch cover shown in FIG. 3.

A preferred embodiment of a clutch cover according to the present invention will now be described with reference to FIGS. 1 and 2.

The clutch cover of the present invention comprises a cover core 11 having a wall portion 12, a pressure plate 13 enclosed by the wall portion 12 and arranged in coaxial relation with the cover core 11, a diaphragm spring 14 arranged between the pressure plate 13 and cover core 11 and in coaxial relation with the pressure plate 13 for urging the same, and a strap 15 connecting the outer peripheral portion of the pressure plate 13 to the outer peripheral portion of the cover core 11. The diaphragm spring 14 is supported on the cover core 11 by pivot rings 31, 32 and a set rivet 33 so as to apply pressure to the pressure plate 13. The strap 15 interconnecting the pressure plate 13 and cover core 11 has its one end secured to the pressure plate 13 by a rivet 16 and its other end secured to the cover core 11 by a rivet 17. The cover core 11 has a wall portion 19 a portion whereof shown at 18 is located at the periphery of the rivet 17. The wall portion 18 at the periphery of the rivet 17 is located closer to the central axis of the assembly than the wall portion 19 and is provided with a cut-out 22 at a portion thereof overlapping the outer edge 14a of the diaphragm spring 14. The cut-out 22 assures that the outer edge of the diaphragm spring 14 will not contact the wall portion 18, thus allowing the wall portion 18 to be brought closer to the central axis X of the assembly than in the prior art. This arrangement allows the rivet 17 to be placed much closer to the cental axis X of the assembly than in the prior-art clutch cover so that the outer peripheral portion 20 of the cover core 11 can be brought closer to the central axis X to afford a more compact clutch cover.

Preferably, the first wall portion to be cut-out is located in a position closer to the central axis X such that without said cut-out the first wall portion would interfere with the outer edge of the diaphragm spring. It is also preferred to configure said first wall portion so as to form an axially extending radial recess directed toward the central axis X from the second wall portion constituting the remainder of the first wall portion in the cover core, and to cut-out the bottom of the recess. Such recess provides an easy access of the caulking jig.

Another advantage of the clutch cover of the present invention resides in that heat produced by the pressure plate 13 is allowed to dissipate through the cut-out 22, thus extending the lifetime of the clutch.

As many apparently widely different embodiments of the present invention can be made without departing from the spirit and scope thereof, it is to be understood that the invention is not limited to the specific embodiments thereof except as defined in the appended claims.

What we claim is:

1. A clutch cover comprising:
   a cover core having a wall portion inclusive of first and remaining second wall portions;
   a pressure plate enclosed by the wall portion of said cover core and arranged in coaxial relation with said cover core;
   a diaphragm spring arranged between said pressure plate and said cover core and in coaxial relation with said pressure plate for urging the same; and
   a strap connecting an outer peripheral portion of said pressure plate to an outer peripheral portion of said cover core;
   the first wall portion of said cover core being located at a periphery of the connection between said strap and said cover core and disposed closer to a central axis of said pressure plate than the second wall portion, said first wall portion being provided with a cut-out at a location corresponding to an outer edge of said diaphragm spring;
   said cut-out of the first wall portion being located in a position closer to the central axis such that interference by the first wall portion with the outer edge of the diaphragm spring is prevented by the location of said cut-out.

2. The clutch cover as defined in claim 1, wherein said first wall portion is configured so as to form an axially extending radial recess directed toward the central axis from the second wall portion.

3. The clutch cover as defined in claim 2, wherein said cut-out has been formed by cutting-out said recess.

* * * * *